(12) United States Patent
Hillman

(10) Patent No.: US 12,704,396 B2
(45) Date of Patent: Aug. 11, 2026

(54) WET GAS HOLDUP GAS FRACTION AND FLOW METER

(71) Applicant: ARAMCO SERVICES COMPANY, Houston, TX (US)

(72) Inventor: Thomas Hillman, Missouri City, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 377 days.

(21) Appl. No.: 18/494,527

(22) Filed: Oct. 25, 2023

(65) Prior Publication Data

US 2024/0053181 A1 Feb. 15, 2024

Related U.S. Application Data

(62) Division of application No. 17/229,087, filed on Apr. 13, 2021, now abandoned.

(51) Int. Cl.
*G01F 1/74* (2006.01)
*G01F 1/667* (2022.01)
(Continued)

(52) U.S. Cl.
CPC ................ *G01F 1/74* (2013.01); *G01F 1/667* (2013.01); *G01F 1/668* (2013.01); *G01F 1/7082* (2013.01);
(Continued)

(58) Field of Classification Search
CPC ........ G01F 1/667; G01F 1/668; G01F 1/7082; G01F 1/74; G01F 15/08; G01N 2291/011; G01N 2291/0226; G01N 29/024; G01N 2291/02433; G01N 2291/02809; G01N 2291/02818; G01N 2291/02836; G01N 2291/045; G01N 2291/048; G01N 2291/101; G01N 2291/102; G01N 29/221; G01N 29/222
See application file for complete search history.

(56) References Cited

U.S. PATENT DOCUMENTS

| | | | | |
|---|---|---|---|---|
| 6,386,018 B1 * | 5/2002 | Letton | G01N 29/032 73/61.79 |
| 6,405,603 B1 * | 6/2002 | Baumoel | G01N 29/48 73/861.24 |

(Continued)

FOREIGN PATENT DOCUMENTS

| | | | |
|---|---|---|---|
| CN | 101883967 A * | 11/2010 | G01F 15/08 |
| WO | WO-8808516 A1 * | 11/1988 | G01F 1/668 |

(Continued)

*Primary Examiner* — David L Singer
(74) *Attorney, Agent, or Firm* — Osha Bergman Watanabe & Burton LLP

(57) ABSTRACT

A method for determining multi-phase flow properties of a fluid includes measuring a first time for a first ultrasonic signal to be emitted from a first transducer into the fluid, reflected off an inner surface of the pipeline, and received back at the first transducer. Measuring a second time for the first ultrasonic signal to be emitted from the first transducer into the fluid and received at a second transducer. Calculating, using the first time and the second time, at least one of: a liquid to gas ratio, a fluid density, a gas holdup, a liquid holdup, and a fluid velocity of the fluid flowing through the pipeline.

8 Claims, 5 Drawing Sheets

(51) Int. Cl.
*G01F 1/7082* (2022.01)
*G01F 15/08* (2006.01)
*G01N 29/024* (2006.01)
*G01N 29/22* (2006.01)

(52) U.S. Cl.
CPC ........... *G01F 15/08* (2013.01); *G01N 29/024* (2013.01); *G01N 29/222* (2013.01); *G01N 2291/011* (2013.01); *G01N 2291/0226* (2013.01); *G01N 2291/02433* (2013.01); *G01N 2291/02809* (2013.01); *G01N 2291/02818* (2013.01); *G01N 2291/02836* (2013.01); *G01N 2291/045* (2013.01); *G01N 2291/048* (2013.01); *G01N 2291/101* (2013.01); *G01N 2291/102* (2013.01)

(56) References Cited

U.S. PATENT DOCUMENTS 8,820,147 B2 * 9/2014 Sinha ................... G01N 29/222 73/61.79
2005/0066744 A1 * 3/2005 Kupnik ................... G01F 1/667 73/861.03
2007/0084286 A1 * 4/2007 Ajay .................... G01N 1/2205 73/597
2007/0295101 A1 * 12/2007 Johansen .............. G01F 1/7082 73/861.04
2009/0229375 A1 * 9/2009 Atkinson .................. G01F 1/34 138/104
2012/0265454 A1 * 10/2012 Rudd ........................ G01F 1/74 702/48
2015/0020608 A1 * 1/2015 Chevrier ................ H02H 9/005 73/861.31
2016/0341586 A1 * 11/2016 Hurmuzlu ................. G01F 1/68
2017/0115388 A1 * 4/2017 Sathyanarayana .... G01S 15/107
2017/0160117 A1 * 6/2017 Hurmuzlu ................. G01F 1/66
2017/0167904 A1 * 6/2017 Sathyanarayana ........ G01F 1/66
2019/0011300 A1 * 1/2019 Gloss ...................... G01F 25/10
2020/0056915 A1 * 2/2020 Pamakstis ............... G01F 1/667
2020/0174036 A1 * 6/2020 Teboulle ................... G01P 5/00
2020/0209030 A1 * 7/2020 Kleinitz .................... G06F 1/04
2020/0209031 A1 * 7/2020 Dabak ..................... G01F 1/668
2021/0172777 A1 * 6/2021 Noboa ................. G05D 7/0635
2022/0205890 A1 * 6/2022 Chen ........................ G01K 1/14
2022/0373373 A1 * 11/2022 Reissner ................. G01F 1/662
2023/0008196 A1 * 1/2023 Deffenbaugh ............ G01F 3/02

FOREIGN PATENT DOCUMENTS

WO WO-2015153130 A1 * 10/2015 .............. G01P 5/001
WO WO-2016133565 A1 * 8/2016 ........... E21B 47/107

* cited by examiner

WET GAS HOLDUP GAS FRACTION AND FLOW METER

CROSS-REFERENCE TO RELATED APPLICATIONS

This Application is a Division of application Ser. No. 17/229,087 filed on Apr. 13, 2021. The entire contents of this application are incorporated herein by reference in their entirety.

BACKGROUND

Hydrocarbon transport systems are used to transport fluids to and from various production and refining operations. Hydrocarbon transport systems use conduits such as pipelines to transport the fluids over long distances. Herein, the term "fluid" is used to describe a substance that has no fixed shape and yields easily to external pressure, and, as such, the term "fluid" may be referring to gases, liquids, or a combination of both. The fluids that are transferred within the hydrocarbon transport systems may be crude oil, dry gas, wet gas, etc. Wet gas, in particular is humid gas or gas with a minimal amount of liquids present. The liquids present may be water, oil, or liquid natural gas/condensate.

In wet gas production, it is important to meter, or measure, the amounts of each fluid (gas or liquid) present in the hydrocarbon transport system. It is difficult to measure the ratio of liquid to gas in wet gas flow due to the inherent differences between these two fluids. Currently, there are a few techniques used in wet gas metering such as using test separators, fluid sampling, tracer methods, etc. However, these techniques often cause pressure loss or are inaccurate, therefore, it is beneficial to develop a technique for wet gas metering that is accurate and does not interfere significantly with the fluid or fluid pressures.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, an apparatus and a method for use of the apparatus for determining multi-phase flow properties of a fluid. In general, and in one embodiment, the apparatus includes a pipeline configured to be a conduit for the fluid; a pressure sensor and a temperature sensor mounted to the pipeline; and a first transducer, mounted to the pipeline, configured to emit and receive a first ultrasonic signal. The first ultrasonic signal reflects off an inner surface of the pipeline to be received back at the first transducer and a liquid to gas ratio is calculated to monitor well productivity.

In some embodiments, a method for determining multi-phase flow properties of a fluid includes measuring a first time for a first ultrasonic signal to be emitted from a first transducer into the fluid, reflected off an inner surface of the pipeline, and received back at the first transducer. Measuring a second time for the first ultrasonic signal to be emitted from the first transducer into the fluid and received at a second transducer. Calculating, using the first time and the second time, at least one of: a liquid to gas ratio, a fluid density, a gas holdup, a liquid holdup, and a fluid velocity of the fluid flowing through the pipeline.

In further embodiments, a method for determining multi-phase flow properties of a fluid includes measuring a first time for a first ultrasonic signal to be emitted from a first transducer into the fluid, reflected off an inner surface of the pipeline, and received back at the first transducer. Measuring a second time for the first ultrasonic signal to be emitted from the first transducer into the fluid, reflected off of a first surface of a first barrier, reflected off of a second surface of a second barrier, and received back at the first transducer. Measuring a third time for the first ultrasonic signal to be emitted from the first transducer into the fluid, reflected off the second surface of the second barrier, reflected off the first surface of the first barrier, and received back at the first transducer. Calculating, using the first time, the second time, and the third time, at least one of: a liquid to gas ratio, a fluid density, a gas holdup, a liquid holdup, and a fluid velocity of the fluid flowing through the pipeline.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Metering of wet gas flow is important in hydrocarbon operations as the amounts of gas and liquid indicate well productivity, and changes in these amounts can indicate a need to change production or completion operations. Embodiments disclosed herein relate to a proposed method of metering wet gas flow that includes utilizing the sound speed of gas. The sound speed of gas is the velocity of a sound wave in a gas. The sound speed of gas may be calculated using ultrasonic pulses. Accordingly, embodiments disclosed herein present apparatuses and methods for metering wet gas flow by emitting ultrasonic pulses into a fluid and measuring the travel time of the pulses from a source to one or more destinations. More specifically, wet gas meter apparatuses disclosed herein are configured to send ultrasonic pulses through the fluid flow and measures the time of the pulse to travel across known distances. Some pressure, volume and temperature quantities are necessary to accurately measure the holdup gas fraction, such as gas composition or bulk modulus which gives the adiabatic gas constant, the pressure, and temperature. All these values effect the sound speed of the media.

Figure 1:
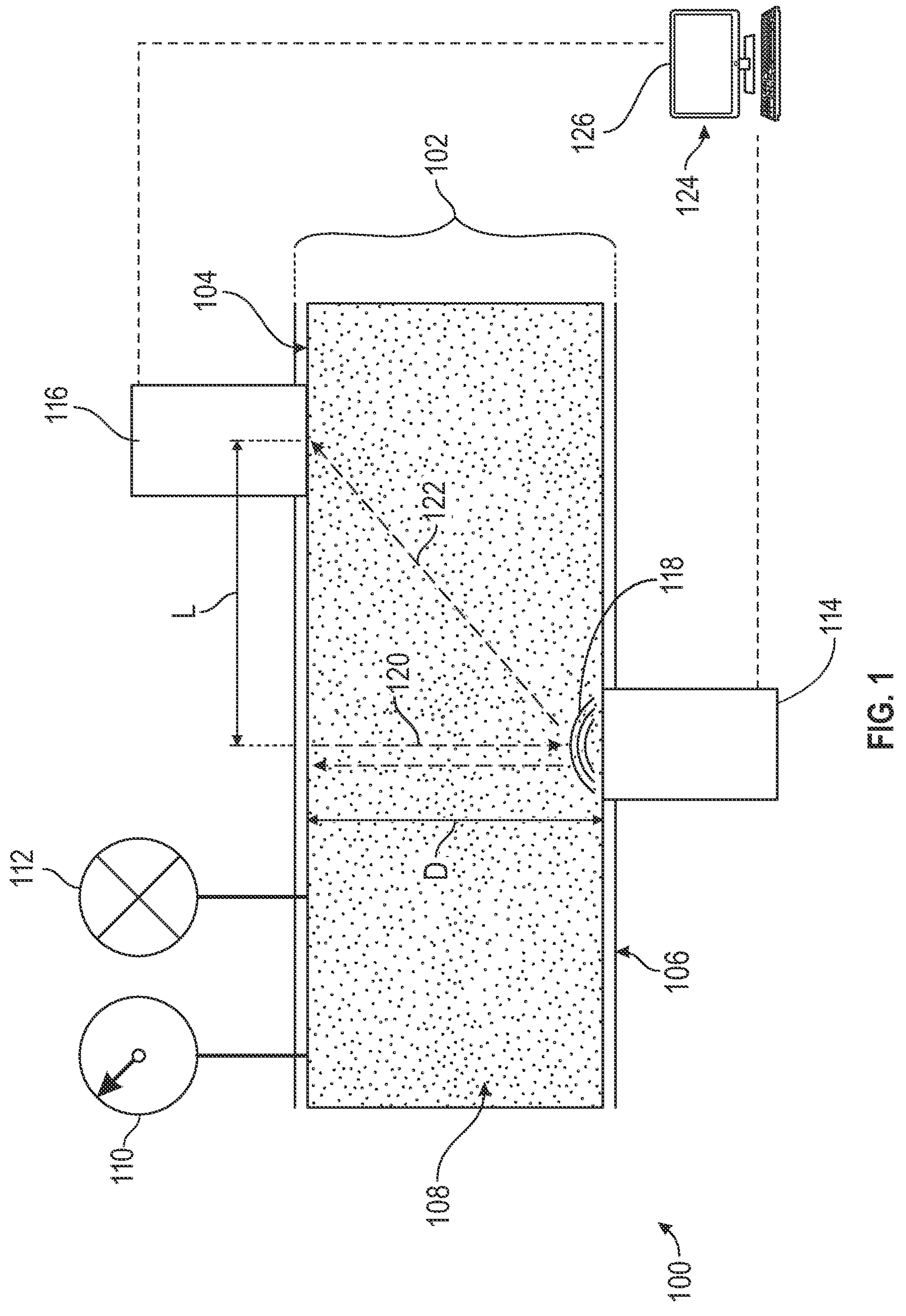
FIG. 1 shows an apparatus in accordance with one or more embodiments.

FIG. 1 shows a wet gas metering apparatus (100) in accordance with one or more embodiments. The wet gas metering apparatus (100) is implemented in a pipeline (102), having an inner surface (104) and an outer surface (106), acting as a conduit for a fluid (108). In further embodiments, the pipeline (102) is horizontal, formed in the shape of a cylinder, and made of any suitable material that can tolerate the pressures and temperatures of the fluid (108), such as steel. Those skilled in the art will appreciate that the pipeline (102) shown in FIG. 1 may be a segment or section of a complete pipeline.

The fluid (108) make-up includes a gas phase and a liquid phase, with the liquid phase dispersed in the gas phase as droplets with a minimal amount of stratified flow occurring. Stratified flow occurs when gravitational separation of the liquid phase and the gas phase is complete, and there is a distinct flow of liquid at the bottom of the pipeline (102).

A temperature sensor (110) is mounted to the outer surface (106) of the pipeline (102). In one or more embodiments, the temperature sensor (110) may breach the pipeline (102) to be flush with the inner surface (104) of the pipeline (102) and be in direct contact with the fluid (108). The temperature sensor (110) may be, for example, a thermocouple sensor, a RTDs sensor (resistance temperature detector), a thermistor sensor, or a semiconductor based integrated circuit sensor.

A pressure sensor (112) is mounted to the outer surface (106) of the pipeline (102). In one or more embodiments, the pressure sensor (112) may breach the pipeline (102) to be flush with the inner surface (104) of the pipeline (102) and be in direct contact with the fluid (108). The pressure sensor (112) may be, for example, a potentiometric sensor, an inductive sensor, a capacitive sensor, a piezoelectric sensor, a strain gauge sensor, or a variable reluctance sensor.

Continuing with FIG. 1, a first transducer (114) is mounted to the outer surface (106) of the pipeline (102). In one or more embodiments, the first transducer (114) may breach the pipeline (102) to be flush with the inner surface (104) of the pipeline (102) and be in direct contact with the fluid (108). The first transducer (114) may be, for example, an ultrasonic transducer capable of sending and receiving ultrasonic signals. Ultrasonic signals are sound waves with high frequencies. Ultrasonic devices are commonly used to detect objects and measure distances.

As shown in FIG. 1, a second transducer (116) is mounted to the outer surface (106) of the pipeline (102) and may, in one or more embodiments, breach the pipeline (102) to be flush with the inner surface (104) of the pipeline (102) and be in direct contact with the fluid (108). The second transducer (116) may also be an ultrasonic transducer capable of sending and receiving ultrasonic signals. In further embodiments, the first transducer (114) and the second transducer (116) are mounted on opposite sides of the outer surface (106) of the pipeline (102), and the second transducer (116) is positioned at a location downstream of the first transducer (114).

In one or more embodiments, the first transducer (114) is configured to emit a first ultrasonic signal (118). The first ultrasonic signal (118) travels along path A (120) and path B (122). Path A (120) traces the first ultrasonic signal (118) being emitted from the first transducer (114) into the fluid (108), reflected off the inner surface (104) of the pipeline (102), and received back at the first transducer (114). Path B (122) traces the first ultrasonic signal (118) being emitted from the first transducer (114) into the fluid (108) and being received at the second transducer (116).

The time it takes for the first ultrasonic signal (118) to traverse path A (120) is referred to as the first time. The time it takes for the first ultrasonic signal (118) to traverse path B (122) is referred to as the second time. In one or more embodiments, a control unit (124) with a computer processor (126) is operatively connected to the first transducer (114) and the second transducer (116) to instruct the first transducer (114) to emit the first ultrasonic signal (118), measure the first time and the second time, and calculate multi-phase flow properties of the fluid (108). The connection operatively connecting the control unit (124) to the first transducer (114) and the second transducer (116) may be any suitable wired or wireless connection. The multi-phase flow properties of the fluid (108) that may be calculated may include a liquid to gas ratio, a fluid density, a gas holdup, a liquid holdup, and a fluid velocity of the fluid (108). A discussion of how these properties are calculated is detailed below.

The liquid to gas ratio and the fluid velocity of the fluid (108) are measured by comparing the travel times of the same ultrasonic pulse along different paths. The length of each path is known by the positions of the transducers and the diameters of the pipeline (102). For the depiction in FIG. 1, the length of path A (120) is 2*D where D is the inner diameter of the pipeline (102). The length of path B (122) is $\sqrt{D^2+L^2}$ where D is the inner diameter of the pipeline (102) and L is the horizontal distance between the center of the first transducer (114) and the center of the second transducer (116).

Moisture present in a gas affects the gas' bulk modulus of elasticity, thus shifting the sound speed of the gas, therefore, liquid content suspended in gas will produce a known shift in the sound speed. As such, a shift in the sound speed of the fluid (108) along Path A (120) correlates to the amount of liquid content present i.e., the liquid to gas ratio of the fluid (108). The measured sound speed may be used to calculate the fluid velocity and the fluid flow rate by measuring the travel time of the first ultrasonic signal (118) pulse directed along Path B (122).

The sound speed of a gas is expressed in Equation (1) below where v=sound speed; γ=adiabatic gas constant; P=pressure; ρ=density of the fluid. The sound speed of a gas is dependent on the gas composition, temperature, and pressure. The pressure of a sound wave is very small (<1 Pa), compare this value to atmospheric pressure which is ~100000 Pa, and, as such, sound waves in air or in hydrocarbon mixtures may be treated as linear. For the purposes of this disclosure, the adiabatic gas constant may be used in the relationship between sound speed, pressure, and density of the fluid.

$$v = \sqrt{\frac{\gamma P}{\rho}} \qquad \text{Equation (1)}$$

Figure 2A:
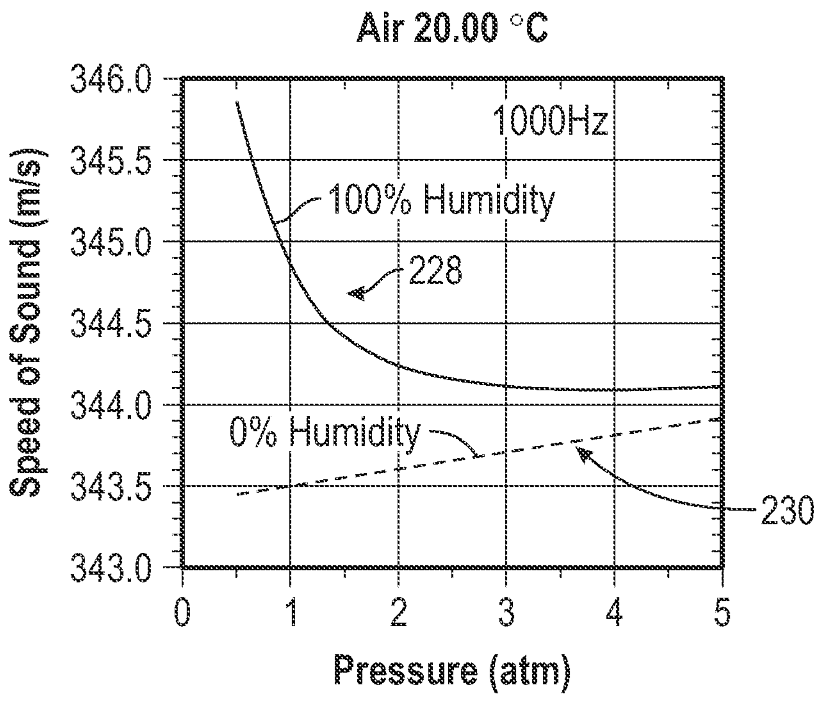
FIG. 2A shows a graph of sound speed vs. pressure.
Figure 2B:
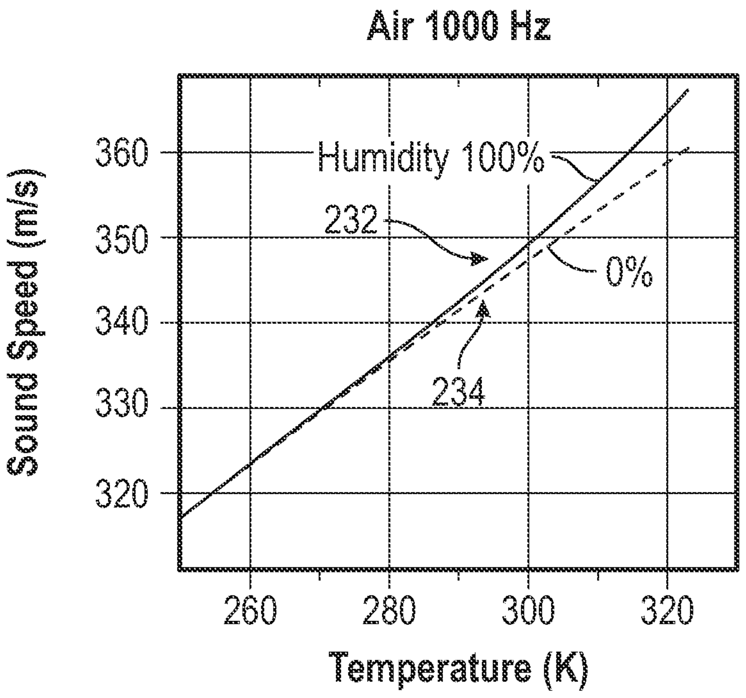
FIG. 2B shows a graph of sound speed vs. temperature.

FIG. 2*a* depicts two curves on a graph of sound speed (in m/s) versus pressure (in atm). The first pressure curve (228) shows how the sound speed of air (at 20 degrees Celsius with 100% humidity) changes as pressure changes. The second pressure curve (230) shows how the sound speed of air (at 20 degrees Celsius with 0% humidity) changes as pressure changes. FIG. 2*b* depicts two curves on a graph of sound speed (in m/s) versus temperature (in K). The first temperature curve (232) shows how the sound speed of air (at atmospheric pressure with 100% humidity) changes as temperature changes. The second temperature curve (234) shows how the sound speed of air (at atmospheric pressure with 0% humidity) changes as temperature changes.

FIG. 2*b* shows that the adiabatic gas constant for air changes very little from air at 0% humidity to air at 100% humidity when temperature increases. FIG. 2*a* shows that the adiabatic gas constant for air converges for air at 0% humidity to air at 100% humidity as pressure increases. This means that the mass of the liquid, whether present as suspended droplets or diffused into the gas as a vapor, will have a predictable effect on the sound speed of the gas, especially at increased pressures such as the pressures seen in wet gas pipelines which are often dozens of atmospheres or higher. Therefore, when pressure and temperature are known, and gas composition can be approximated to within reasonable error, the liquid content can be measured by its effect on the sound speed of the fluid (108), and the fluid velocity can be determined by transmitting sound along the flow and comparing the receiving time downstream to the expected receiving time if there was no flow.

For the apparatus as depicted in FIG. 1, the sound speed of the fluid (108) is determined by the length of path A (120) and the first time. The calculation for this sound speed is shown below in Equation (2). Where 2*D is the length of path A (120) and t is the first time.

$$v = \frac{2*D}{t} \qquad \text{Equation (2)}$$

Figures 3, 4:
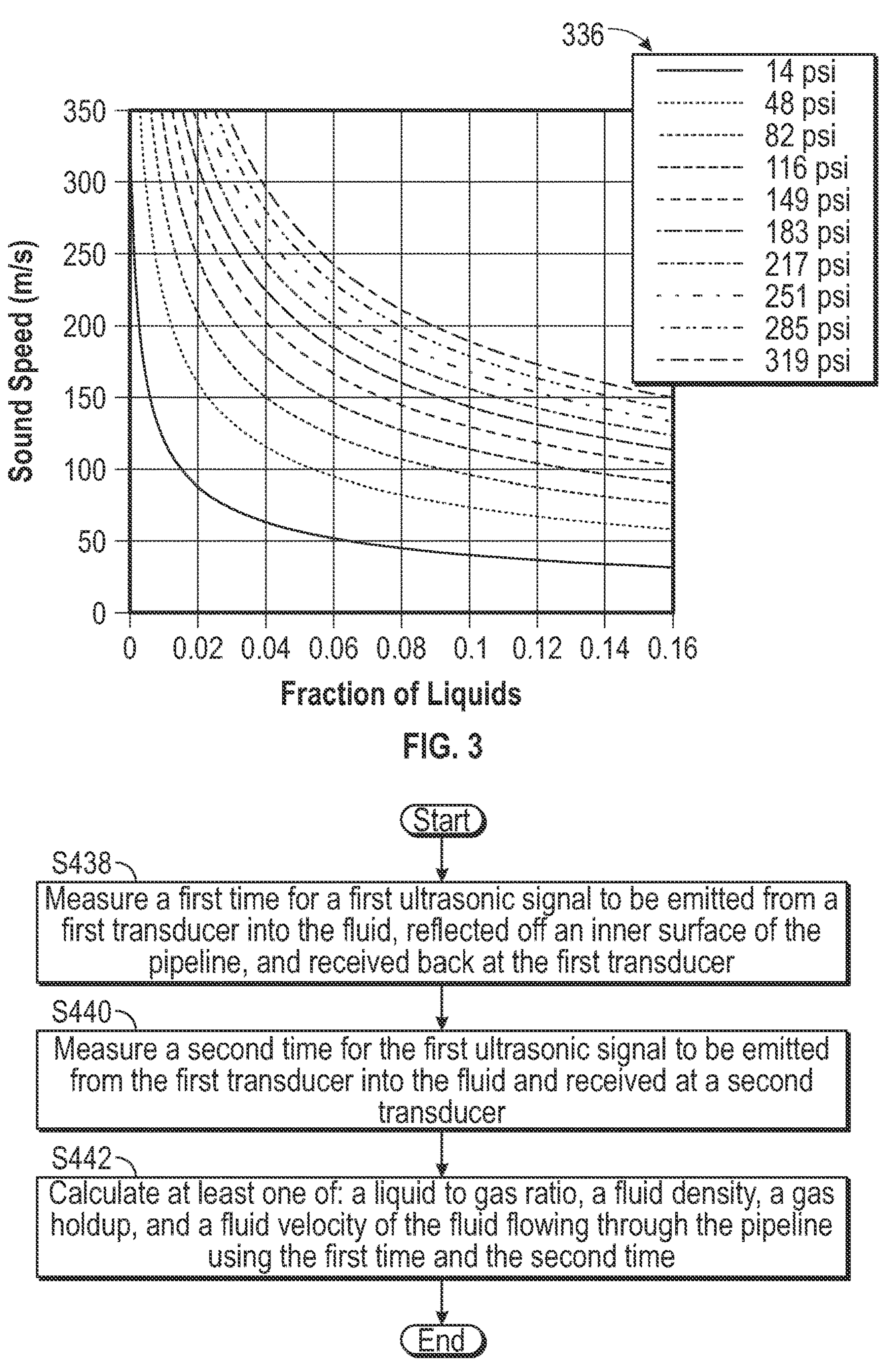
FIG. 3 shows sound speed curves at different pressures.
FIG. 4 shows a flowchart in accordance with one or more embodiments.

The liquid to gas ratio may be determined by using sound speed curves such as those depicted in FIG. 3. FIG. 3 depicts a plurality of sound speed curves (336) at different pressures. The sound speed curves (336) show the relationship between the sound speed (in m/s) and the fraction of liquids i.e., what percent of the total volume of the fluid (108) is occupied by the liquid phase. The sound speed curves (336) depicted in FIG. 3 are for only one temperature. These sound speed curves (336) will shift as temperature changes; therefore, the temperature of the fluid (108) must be known to select the correct sound speed curve (336). For the apparatus depicted in FIG. 1, the pressure and temperature of the fluid (108) is known due to the pressure sensor (112) and the temperature sensor (110) and, as such, the proper sound speed curve (336) may be chosen. The sound speed of the fluid (108) may be calculated by using Equation (2) and, using the proper sound speed curve (336), the fraction of liquids, or the liquid to gas ratio, may be determined.

The density of the fluid (108) flowing through the pipeline (102) may be determined using Equation (3) below. Equation (3) is derived by equating Equation (1) to Equation (2) and solving for the density of the fluid (108).

$$\rho = \frac{\gamma P}{\left(\frac{D*2}{t}\right)^2} \qquad \text{Equation (3)}$$

The density of a mixture ($\rho$) is the sum of the component densities ($\rho_l$=density of the liquid phase and $\rho_g$=density of the gas phase) multiplied by their volume fractions (G=the gas volume fraction (or the gas holdup) and L=the liquid volume fraction (or the liquid holdup)), as such, for a two-phase fluid (108), 1=G+L; L=1−G; and $\rho=G*\rho_g+(1-G)*\rho_l$ solving this equation for G gives Equation (4), below, which is used to directly calculate the gas holdup as the other variables are known. The liquid holdup may then be calculated using L=1−G when the gas holdup is determined.

$$G = \frac{\rho - \rho_l}{\rho_g - \rho_l} \qquad \text{Equation (4)}$$

The velocity of the fluid (108) flowing through the pipeline (102) is determined by the sound speed calculated from Equation (2) and the second time. Because the fluid (108) is flowing, the second time is depicted in Equation (5) below where $\sqrt{D^2+L^2}$=the length of path B (122); $v_f$=the fluid velocity; θ=the angle between path B (122) and a horizontal axis. Equation (5) may be rearranged into Equation (6) to solve for the fluid velocity as the other variables are known.

$$t = \frac{\sqrt{D^2+L^2}}{v + v_f * \cos(\theta)} \qquad \text{Equation (5)}$$

$$v_f = \frac{\frac{\sqrt{D^2+L^2}}{t} - v}{\cos(\theta)} \qquad \text{Equation (6)}$$

FIG. 4 depicts a flowchart in accordance with one or more embodiments. More specifically, FIG. 4 illustrates a method for measuring multi-phase flow properties of the fluid (108) flowing through the pipeline (102). Further, one or more blocks in FIG. 4 may be performed by one or more components as described in FIG. 1 (e.g., the computer processor (126)). While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, the time it takes for the first ultrasonic signal (118) to traverse path A (120) is measured (S438) and recorded as a first time. More specifically, as described above, a first ultrasonic signal (118) is emitted from a first transducer (114) into the fluid (108). The first ultrasonic signal (118) traverses a path, such as path A (120). Path A (120) may involve the first ultrasonic signal (118) being emitted from the first transducer (114) into the fluid (108), reflected off the inner surface (104) of the pipeline (102), and received back at the first transducer (114).

Next, a second time including the time it takes for the first ultrasonic signal (118) to traverse path B (122) is measured (S440). The first ultrasonic signal (118) traverses path B (122), which includes the first ultrasonic signal (118) being emitted from the first transducer (114) into the fluid (108) and received at a second transducer (116). As noted above, the first transducer may be disposed along the pipeline on opposite sides, with the second transducer being downstream of the first.

Using the equations above, a control unit (124) with a computer processor (126) calculates one or more multi-phase flow properties of the fluid (108). The multi-phase flow properties may include a liquid to gas ratio, a fluid density, a gas holdup, a liquid holdup, and a fluid velocity of the fluid (108) flowing through the pipeline (102). More specifically, the multi-phase flow properties may be calculated by using the first time and the second time (S442) and following the calculations outlined previously in this disclosure. The multi-phase flow properties may also be calculated using temperature and pressure readings from temperature sensors (110) and pressure sensors (112) mounted to the pipeline (102).

Figure 5:
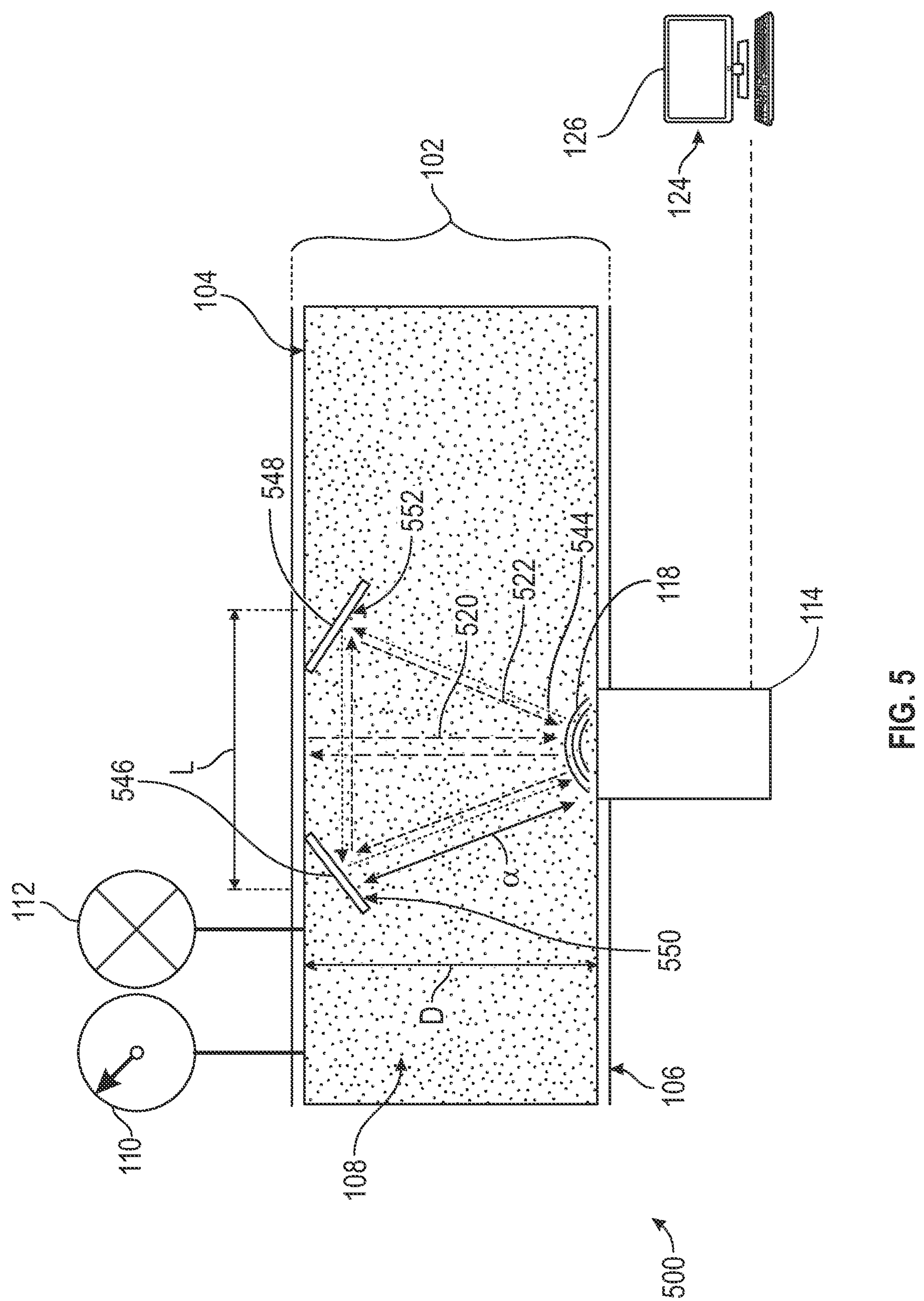
FIG. 5 shows an apparatus in accordance with one or more embodiments.

FIG. 5 shows a wet gas metering apparatus (500) layout that allows for the multi-phase fluid properties to be alternatively calculated compared to the wet gas metering apparatus (100) layout depicted in FIG. 1. The components of the system depicted in FIG. 5 that are identical/similar to the components of the system described in FIG. 1 are not re-described for purposes of readability and have the same functions described above.

In the embodiment of FIG. 5, a first barrier (546) and a second barrier (548) are mounted to the inner surface (104) of the pipeline (102). The first barrier (546) and the second barrier (548) are positioned at an angle such that a first surface (550) of the first barrier (546) is directed towards a second surface (552) of the second barrier (548). The first barrier (546) and the second barrier (548) may be any shape and of any dimension, however, it may be beneficial to size the first barrier (546) and the second barrier (548) such that the interference with the flow of the fluid (108) is minimal. The first barrier (546) and the second barrier (548) may be made of any suitable material that is able to tolerate the conditions created by the fluid (508). In one or more embodiments, the first barrier (546) and the second barrier (548) may be flat metal plates mounted to the inner surface (104) of the pipeline (102). Those skilled in the art will appreciate that the barriers (546, 548) are required to be thin enough (in the direction perpendicular to the plane depicted in FIG. 5) to not act as a significant barrier to flow. Further, the barriers (546, 548) are angled to reflect the ultrasonic pulse along the path lines.

In further embodiments, the first barrier (546) and the first transducer (514) are mounted on opposite sides of the pipeline (102) and the first barrier (546) is positioned in a location upstream of the first transducer (114). Similarly, the second barrier (548) and the first transducer (114) are mounted on opposite sides of the pipeline (102) and the second barrier (548) is positioned in a location downstream of the first transducer (114). In one or more embodiments, the distance between the first transducer (114) and the first barrier (546) is the same as the distance between the first transducer (114) and the second barrier (548). This distance is designated as α in FIG. 5.

In one or more embodiments, the first transducer (114) emits a first ultrasonic signal (118). The first ultrasonic signal (118) travels along path A (520), path B (522), and path C (544). Path A (520) consists of the first ultrasonic signal (118) being emitted from the first transducer (114) into the fluid (108), reflected off the inner surface (104) of the pipeline (102), and received back at the first transducer (114).

Path B (522) traverses the first ultrasonic signal (118) being emitted from the first transducer (114) into the fluid (108), reflected off of the first surface (550) of the first barrier (546), reflected off of the second surface (552) of the second barrier (548), and received back at the first transducer (114). Path C (544) traverses the first ultrasonic signal (118) being emitted from the first transducer (114) into the fluid (108), reflected off of the second surface (552) of the second barrier (548), reflected off the first surface (550) of the first barrier (546), and received back at the first transducer (114).

For purposes of the embodiment of FIG. 5, the time it takes for the first ultrasonic signal (118) to traverse path A (520) is referred to as time A. The time it takes for the first ultrasonic signal (118) to traverse path B (522) is called time B. The time it takes for the first ultrasonic signal (118) to traverse path C (544) is called time C. A control unit (124) with a computer processor (126) is connected to the first transducer (114) to emit the first ultrasonic signal (118), measure time A, B, and C, and calculate multi-phase flow properties of the fluid (108). The connection connecting the control unit (124) to the first transducer (114) may be a wired or wireless connection. The multi-phase flow properties of the fluid (108) that may be calculated may comprise a liquid to gas ratio, a fluid density, a gas holdup, a liquid holdup, and a fluid velocity of the fluid (108).

For the apparatus as depicted in FIG. 5, the sound speed of the fluid (108) is determined by the length of path A (520) and time A, or the time it takes for the first ultrasonic signal (118) to traverse path A (520). The calculation for this sound speed is shown in Equation (2). Where 2*D is the length of path A (520), where D is the inner diameter of the pipeline (102), and t is time A.

The liquid to gas ratio of the fluid (108) in FIG. 5 may be determined by using sound speed curves such as those depicted in FIG. 3. For the apparatus as depicted in FIG. 5, the pressure of the fluid (108) is known due to the pressure sensor (112) and, as such, the proper sound speed curve (336) may be chosen. The sound speed of the fluid (108) may be calculated by using Equation (2) and, using the proper sound speed curve (336), the fraction of liquids, or the liquid to gas ratio, may be determined.

The density of the fluid (108) flowing through the pipeline (102) in FIG. 5 may be calculated using Equation (3) disclosed previously. Using the density of the fluid (108) calculated using Equation (3), the gas holdup of the fluid (108) in FIG. 5 may be determined by using Equation (4) disclosed previously.

The velocity of the fluid (108) flowing through the pipeline (102) in FIG. 5 is determined by the sound speed calculated from Equation (2) and the difference between time B and time C. The calculation to determine the second time is shown in Equation (7) below where $t_2$=time B; α=the distance between the first transducer (114) and either barrier (546, 548); v=the sound speed of the fluid (508); $v_f$=fluid velocity; θ=the angle of the path B (522) or path C (544) from a horizontal axis; L=the distance between the centers of the first barrier (546) and the second barrier (548).

$$t_2 = \frac{a}{v - v_f \cos(\theta)} + \frac{L}{v + v_f} + \frac{a}{v + v_f \cos(\theta)} \quad \text{Equation (7)}$$

The calculation to determine the third time is shown in Equation (8) below where $t_3$=time C.

$$t_3 = \frac{a}{v + v_f \cos(\theta)} + \frac{L}{v - v_f} + \frac{a}{v - v_f \cos(\theta)} \quad \text{Equation (8)}$$

Subtracting $t_3$ from $t_2$ leaves Equation (9) below:

$$t_2 - t_3 = \Delta t = \frac{L}{v + v_f} - \frac{L}{v - v_f} \quad \text{Equation (9)}$$

Rearranging Equation (9) to solve for the fluid velocity produces Equation (10a) and Equation (10b) below:

$$v_f = \frac{L - \sqrt{L^2 + \Delta t^2 v^2}}{\Delta t} \quad \text{Equation (10a)}$$

$$v_f = \frac{L + \sqrt{L^2 + \Delta t^2 v^2}}{\Delta t} \quad \text{Equation (10b)}$$

Figure 6:
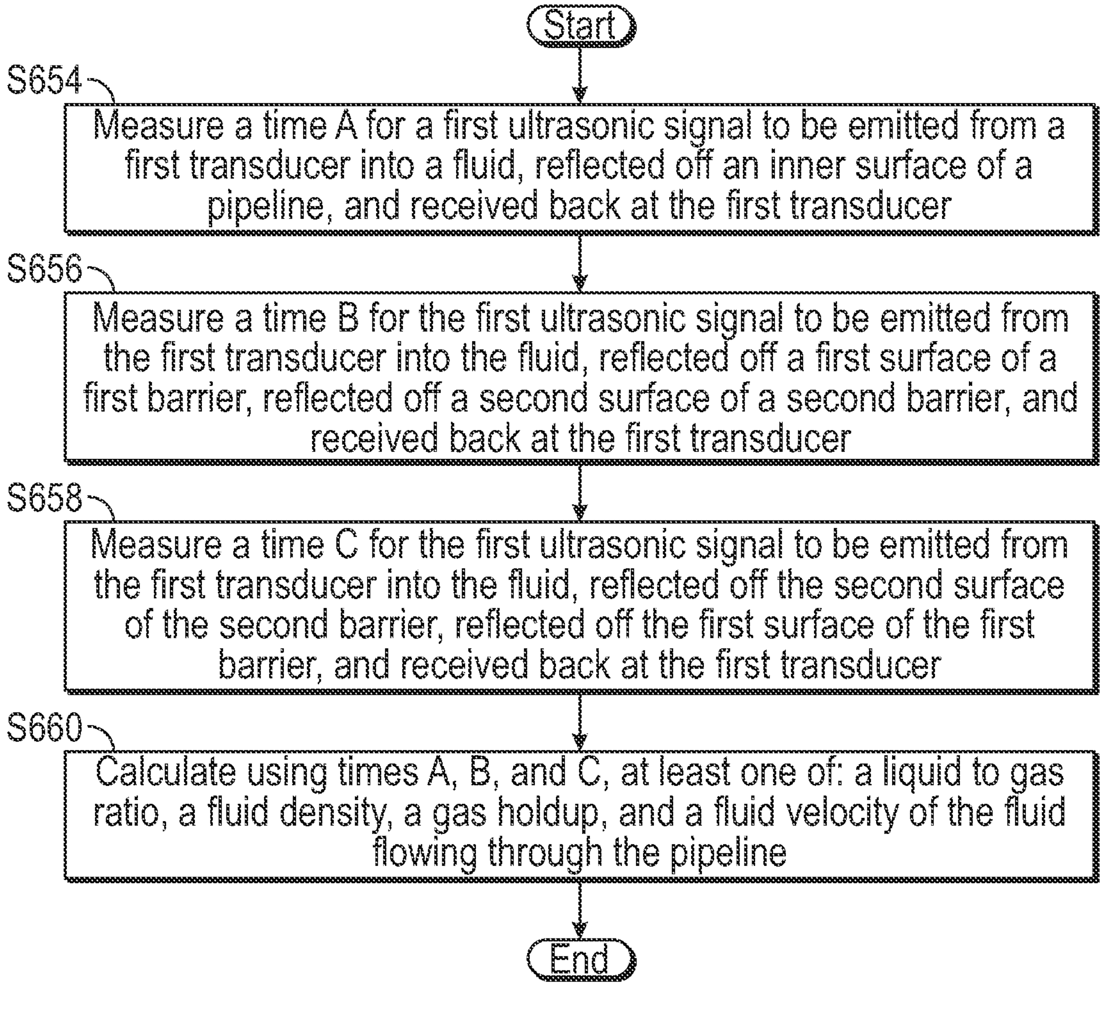
FIG. 6 shows a flowchart in accordance with one or more embodiments.

FIG. 6 depicts a flowchart in accordance with one or more embodiments. More specifically, FIG. 6 illustrates a method for measuring multi-phase flow properties of the fluid (108) flowing through the pipeline (102). Further, one or more blocks in FIG. 6 may be performed by one or more components as described in FIG. 5 (e.g., the computer processor (126)). While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

A first barrier (546) having a first surface (550) and a second barrier (548) having a second surface (552) are mounted to the inner surface (104) of the pipeline (102). The first barrier (546) and the second barrier (548) are positioned at an angle such that the first surface (550) of the first barrier (546) is directed towards the second surface (552) of the second barrier (548). In further embodiments, the pipeline (102) is horizontal, formed in the shape of a cylinder, and made of any suitable material that can tolerate the pressures and temperatures of the fluid (108) such as steel.

Initially, a first ultrasonic signal (118) is emitted from the first transducer (114) into the fluid (108). The first ultrasonic signal (118) traverses path A (520). Path A (520) includes the first ultrasonic signal (118) being emitted from the first transducer (118) into the fluid (108), reflected off the inner surface (104) of the pipeline (102), and received back at the first transducer (114). Time A, including the time it takes for the first ultrasonic signal (118) to traverse path A (520), is measured (S654).

The first ultrasonic signal (118) also traverses path B (522). Path B (522) includes the first ultrasonic signal (118) being emitted from the first transducer (114) into the fluid (108), reflected off of the first surface (550) of the first barrier (546), reflected off of the second surface (552) of the second barrier (548), and received back at the first transducer (114). Time B, including the time it takes for the first ultrasonic signal (118) to traverse path B (522), is measured (S656).

The first ultrasonic signal (118) traverses path C (544). Path C (544) includes the first ultrasonic signal (118) being emitted from the first transducer (114) into the fluid (108), reflected off of the second surface (552) of the second barrier (548), reflected off the first surface (550) of the first barrier (546), and received back at the first transducer (114). Time C, including the time it takes for the first ultrasonic signal (518) to traverse path C (544), is measured (S658).

A control unit (524) with a computer processor (526) may be connected to the first transducer (514) to emit the first ultrasonic signal (518), measure times A, B, and C, and calculate the multi-phase flow properties of the fluid (508). The multi-phase flow properties may comprise a liquid to gas ratio, a fluid density, a gas holdup, a liquid holdup, and a fluid velocity of the fluid (508) flowing through the pipeline (502). The multi-phase flow properties may be calculated by using times A, B, and C (S660) and following the calculations outlined above in this disclosure. The multi-phase flow properties may also be calculated using temperature and pressure readings from temperature sensor (110) and pressure sensor (112) mounted to the pipeline (102), for example. In further embodiments, a separator may be mounted to the pipeline (102) to separate the gas from the liquid, and the gas-phase density and the liquid-phase density of the fluid (108) may be measured.

Embodiments disclosed herein provide an apparatus that makes it easier to measure the ratio of liquid and gas in wet gas flow, which may ordinary be difficult due to the inherent differences between the fluids. The wet gas meter disclosed herein is configured to measure both holdup gas fraction and flow rate simultaneously. Knowledge of fluid properties within a pipeline, such as the liquid to gas ratio, indicate well productivity, and changes in these fluid properties may indicate a need to change production or completion operations. Furthermore, the ability to monitor the fluid velocity allows for proper sizing of pipeline equipment such as choke valves, and the fluid density and the gas holdup may represent the flow regimes and feed distribution of the fluid flowing through the pipeline. Thus, in one or more embodiments, multi-phase flow properties calculated in S660 in FIG. 6 may be used to make decisions regarding changing operations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method for determining multi-phase flow properties of a fluid within a pipeline comprising:

measuring a first time for a first ultrasonic signal to be emitted from a first transducer into the fluid, reflected off an inner surface of the pipeline, and received back at the first transducer;

measuring a second time for the first ultrasonic signal to be emitted from the first transducer into the fluid, reflected off of a first surface of a first barrier, reflected off of a second surface of a second barrier, and received back at the first transducer, wherein the first barrier and the second barrier are mounted to the inner surface of the pipeline and positioned at an angle such that the first surface of the first barrier is directed towards the second surface of the second barrier, wherein the first barrier and the first transducer are mounted on opposite sides of the pipeline and the first barrier is positioned in a location upstream of the first transducer, and wherein the second barrier and the first transducer are mounted on opposite sides of the pipeline and the second barrier is positioned in a location downstream of the first transducer;

measuring a third time for the first ultrasonic signal to be emitted from the first transducer into the fluid, reflected off the second surface of the second barrier, reflected off the first surface of the first barrier, and received back at the first transducer; and calculating, using the first time, the second time, and the third time, at least one of: a liquid to gas ratio, a fluid density, a gas holdup, a liquid holdup, and a fluid velocity of the fluid flowing through the pipeline.

2. The method of claim 1, wherein the liquid to gas ratio is determined using a sound speed curve, the first time, the second time, and the third time.

3. The method of claim 1, wherein the first transducer is mounted on an outer surface of the pipeline, and the first transducer breaches the pipeline to be flush with the inner surface of the pipeline such that the first transducer is in direct contact with the fluid.

4. The method of claim 1, wherein the fluid is comprised of a gas and a liquid phase and the liquid phase is dispersed in the gas phase as droplets with a minimal amount of stratified flow occurring.

5. The method of claim 1, wherein a temperature sensor and a pressure sensor are mounted on the pipeline.

6. The method of claim 1, wherein a control unit with a computer processor is connected to the first transducer to emit the first ultrasonic signal, measure the first time, the second time, and the third time, and calculate the multi-phase flow properties of the fluid.

7. An apparatus for determining multi-phase flow properties of a fluid comprising:

a pipeline configured to be a conduit for the fluid;

a pressure sensor mounted to the pipeline;

a temperature sensor mounted to the pipeline;

a first transducer, mounted to the pipeline, configured to emit and receive a first ultrasonic signal wherein the first ultrasonic signal reflects off an inner surface of the pipeline to be received back at the first transducer;

a first barrier comprising a first surface;

a second barrier comprising a second surface; and a control unit, with a computer processor, connected to the first transducer to emit the first ultrasonic signal and calculate the multi-phase flow properties of the fluid, wherein the first ultrasonic signal is emitted into the fluid, reflected off of the first surface of the first barrier, reflected off of the second surface of the second barrier, and received back at the first transducer, wherein the first ultrasonic signal is emitted into the fluid, reflected off the second surface of the second barrier, reflected off the first surface of the first barrier, and received back at the first transducer, wherein the first barrier and the second barrier are mounted to the inner surface of the pipeline and positioned at an angle such that the first surface of the first barrier is directed towards the second surface of the second barrier, wherein the first barrier and the first transducer are mounted on opposite sides of the pipeline and the first barrier is positioned in a location upstream of the first transducer, wherein the second barrier and the first transducer are mounted on opposite sides of the pipeline and the second barrier is positioned in a location downstream of the first transducer, and wherein a liquid to gas ratio is calculated to monitor well productivity.

8. The apparatus of claim 7, wherein the fluid is comprised of a gas and a liquid phase and the liquid phase is dispersed in the gas phase as droplets with a minimal amount of stratified flow occurring.

* * * * *